US011263851B2

(12) United States Patent
Proctor

(10) Patent No.: US 11,263,851 B2
(45) Date of Patent: Mar. 1, 2022

(54) SYSTEMS AND METHODS FOR ADVANCED HEADWEAR

(71) Applicant: Michael K. Proctor, Provo, UT (US)

(72) Inventor: Michael K. Proctor, Provo, UT (US)

(*) Notice: Subject to any disclaimer, the term of this patent is extended or adjusted under 35 U.S.C. 154(b) by 0 days.

(21) Appl. No.: 14/851,761

(22) Filed: Sep. 11, 2015

(65) Prior Publication Data

US 2016/0203663 A1 Jul. 14, 2016

Related U.S. Application Data

(60) Provisional application No. 62/049,133, filed on Sep. 11, 2014.

(51) Int. Cl.
| | |
|---|---|
| *G06F 3/16* | (2006.01) |
| *G07C 9/28* | (2020.01) |
| *F21V 23/04* | (2006.01) |
| *F21V 33/00* | (2006.01) |
| *A41D 1/00* | (2018.01) |
| *A42B 1/004* | (2021.01) |
| *A42B 1/242* | (2021.01) |
| *F21Y 115/10* | (2016.01) |

(52) U.S. Cl.
CPC ............... *G07C 9/28* (2020.01); *A41D 1/002* (2013.01); *A42B 1/004* (2013.01); *A42B 1/242* (2013.01); *F21V 23/045* (2013.01); *F21V 33/0008* (2013.01); *G06F 3/16* (2013.01); *F21Y 2115/10* (2016.08)

(58) Field of Classification Search
CPC ..... G07C 9/00111; A42B 1/004; A42B 1/242; A41D 1/002; F21V 33/0008; F21V 23/045; G06F 3/16; F21Y 2115/10

USPC .......................................................... 345/7–9
See application file for complete search history.

(56) References Cited

U.S. PATENT DOCUMENTS

| | | | | |
|---|---|---|---|---|
| 8,282,101 B2* | 10/2012 | Snoddy | ................ | A63F 9/0612 273/156 |
| 2005/0068170 A1* | 3/2005 | Aupperle | ........... | G08B 13/2462 340/539.15 |
| 2007/0109134 A1* | 5/2007 | Dugan | ............. | G08B 13/19608 340/573.1 |
| 2008/0018472 A1* | 1/2008 | Dasilva | ................... | F16P 3/147 340/572.4 |
| 2011/0001827 A1* | 1/2011 | Ortiz | .................. | H04L 63/0492 348/156 |

(Continued)

FOREIGN PATENT DOCUMENTS

WO 2005/080867 A1 9/2005

*Primary Examiner* — Carolyn R Edwards
(74) *Attorney, Agent, or Firm* — Michael F. Krieger; Kirton McConkie

(57) ABSTRACT

Some aspects of the present invention relate to a system for providing a plurality of RFID detectors or readers in zones of an exhibition facility and a wearable RFID tag. Some aspects relate to RFID tags including regular identification data and VIP status. Some aspects relate to RFID readers detecting the presence of an RFID tag in their proximity and triggering an event based on that detection. Some aspects relate to headwear illumination and the synchronized illumination of a plurality of illuminated headwear devices over a network connection. Some aspects relate to electronically-enhanced headwear comprising a microprocessor unit and connected electronic attachments.

3 Claims, 7 Drawing Sheets

(56) References Cited

U.S. PATENT DOCUMENTS

| | | | |
|---|---|---|---|
| 2012/0196661 A1* | 8/2012 | Snoddy | A63F 9/0612 463/9 |
| 2013/0033852 A1* | 2/2013 | Liao | A42B 3/0433 362/106 |
| 2013/0127589 A1* | 5/2013 | Canora | H04N 7/18 340/5.1 |
| 2013/0305437 A1* | 11/2013 | Weller | A42B 3/221 2/422 |
| 2014/0208487 A1* | 7/2014 | Orientale | A42B 3/0433 2/422 |
| 2016/0210785 A1* | 7/2016 | Balachandreswaran | H04N 13/204 |

* cited by examiner

SYSTEMS AND METHODS FOR ADVANCED HEADWEAR

RELATED APPLICATIONS

This application claims priority to United States Provisional Patent Application Ser. No. 62/049,133 filed Sep. 11, 2014 and titled, "An Identification System for Use in an Entertainment Facility."

BACKGROUND OF THE INVENTION

1. Field of the Invention

The invention relates generally to methods and systems for electronically-enhanced headwear comprising identification, geo-location, physiological monitoring, photography, videography, social networking, computing and other functions.

2. Background and Related Art

Entertainment facilities, such as theme parks, amusement parks, adventure parks, carnivals, circuses, safari parks, water parks, amusement centers, family fun centers, fairs, ski resorts, cruise ships, sports stadiums, national parks, state parks, Olympic venues, tourist attractions and funfairs, are challenged by the needs of large crowds with insatiable desires for new, exciting, and entertaining attractions.

Crowd control challenges are particularly numerous and demanding in large entertainment facilities. In such facilities, children are more easily lost, restroom and/or food service facilities become crowded, and lines for attractions may become very long. Moreover, entertainment challenges exist because after a time visitors tend to become bored of the same rides, shows, exhibits, and tours. As such, entertainment facility administrators constantly try to provide new, exciting, entertaining attractions that will appeal to first-time and repeat visitors.

Thus, while techniques currently exist for providing entertainment facilities, challenges still exist, including the difficulty of providing adequate crowd control services and the high cost of updating, modifying, and customizing these facilities. Accordingly, it would be an improvement in the art to augment or even replace current techniques with other techniques.

BRIEF SUMMARY OF THE INVENTION

The present invention relates to a system for providing a plurality of RFID readers in an entertainment facility and a RFID tag, carried by persons within the entertainment facility, which includes regular identification data and VIP status data. An RFID reader within the entertainment facility detects the presence of a RFID tag near it and triggers an effect that is different for VIP guests than for regular guests.

An entertainment facility may provide for various entertaining, novel, and informative effects and utilize various RFID tag/reader embodiment systems to produce these effects. A first embodiment relates to a system for compiling statistical information about visitor traffic within an entertainment facility. A second embodiment relates to a system for providing parents with location information of a lost child within an entertainment facility. A third embodiment relates to a system for producing an enhanced ride feature to a person on an amusement ride. A fourth embodiment relates to a system for producing an enhanced visual and/or audio effect in the entertainment facility for VIP visitors. A fifth embodiment relates to a system for announcing VIP entertainment features. A sixth embodiment relates to a system for producing a visual effect from a light element coupled to the headwear system. Lastly, a seventh embodiment relates to a system for producing an audio effect from an audio device coupled to the headwear system.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
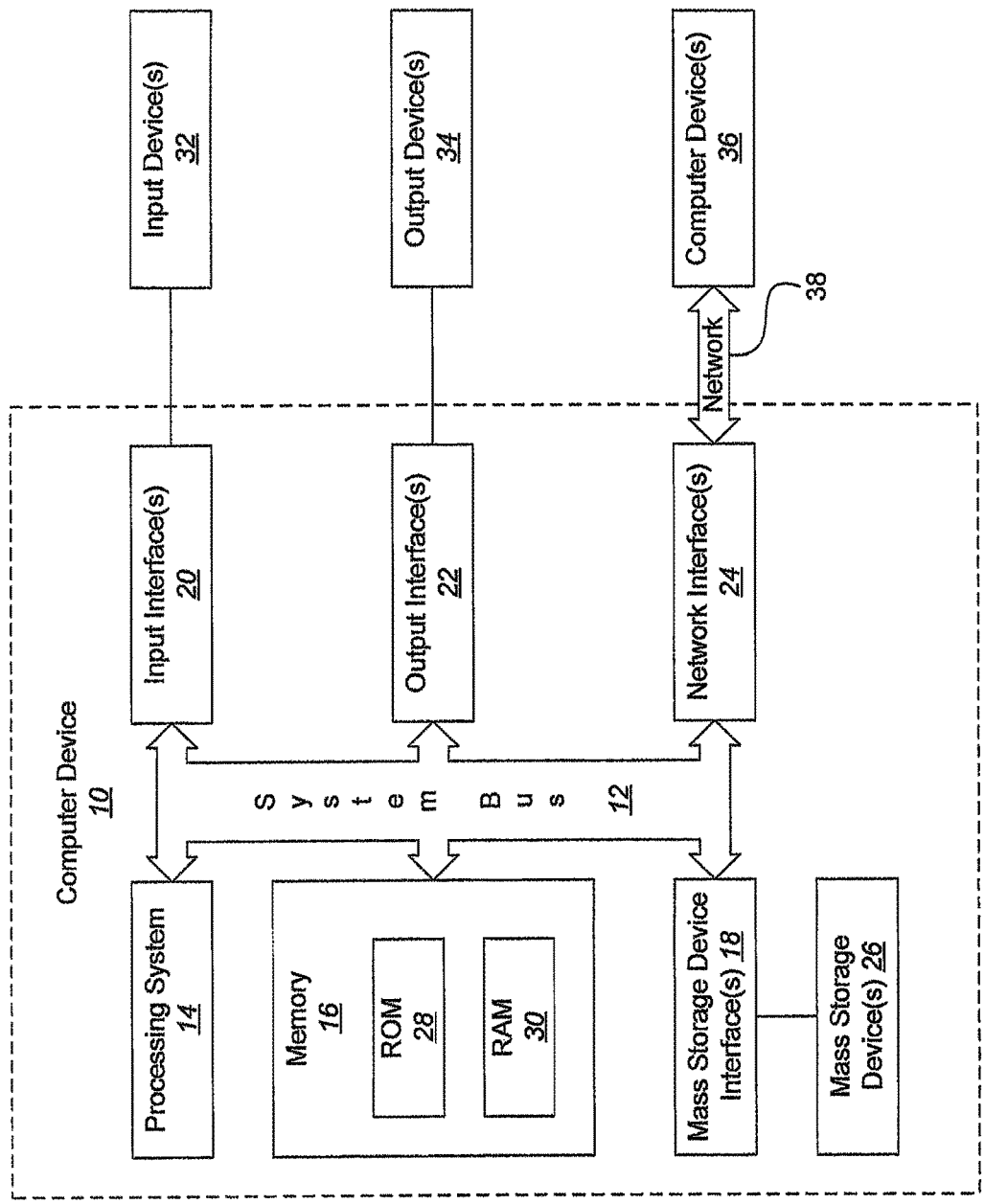
FIG. 1 shows an exemplary general-purpose computer system.

A description of embodiments of the present invention will now be given. It is expected that the present invention may take many other forms and shapes, hence the following disclosure is intended to be illustrative and not limiting, and the scope of the invention should be determined by reference to the appended claims and their equivalents.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part,"

"section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

Various operations may be described as multiple discrete operations in turn, in a manner that may be helpful in understanding embodiments of the present invention; however, the order of description should not be construed to imply that these operations are order dependent.

The description may use the phrases "in an embodiment," "in some embodiments," "in various embodiments," or other similar phrase, which may each refer to one or more of the same or different embodiments. Furthermore, the terms "comprising," "including," "having," and the like, as used with respect to embodiments of the present invention, are synonymous with the definition afforded the term "comprising."

The term "etc." may be used. It should be understood that the term indicates that other examples or elements are possible. The term "etc." should not be interpreted to be limited in kind, category, or similarity to the terms that precede it, but instead indicate that there are other possible examples or elements that could be given that may or may not be wholly different from the terms that precede it.

For the purposes of the present invention, the phrase "A/B" means "A or B." For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard, touchpad, dedicated buttons, mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a fire wire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
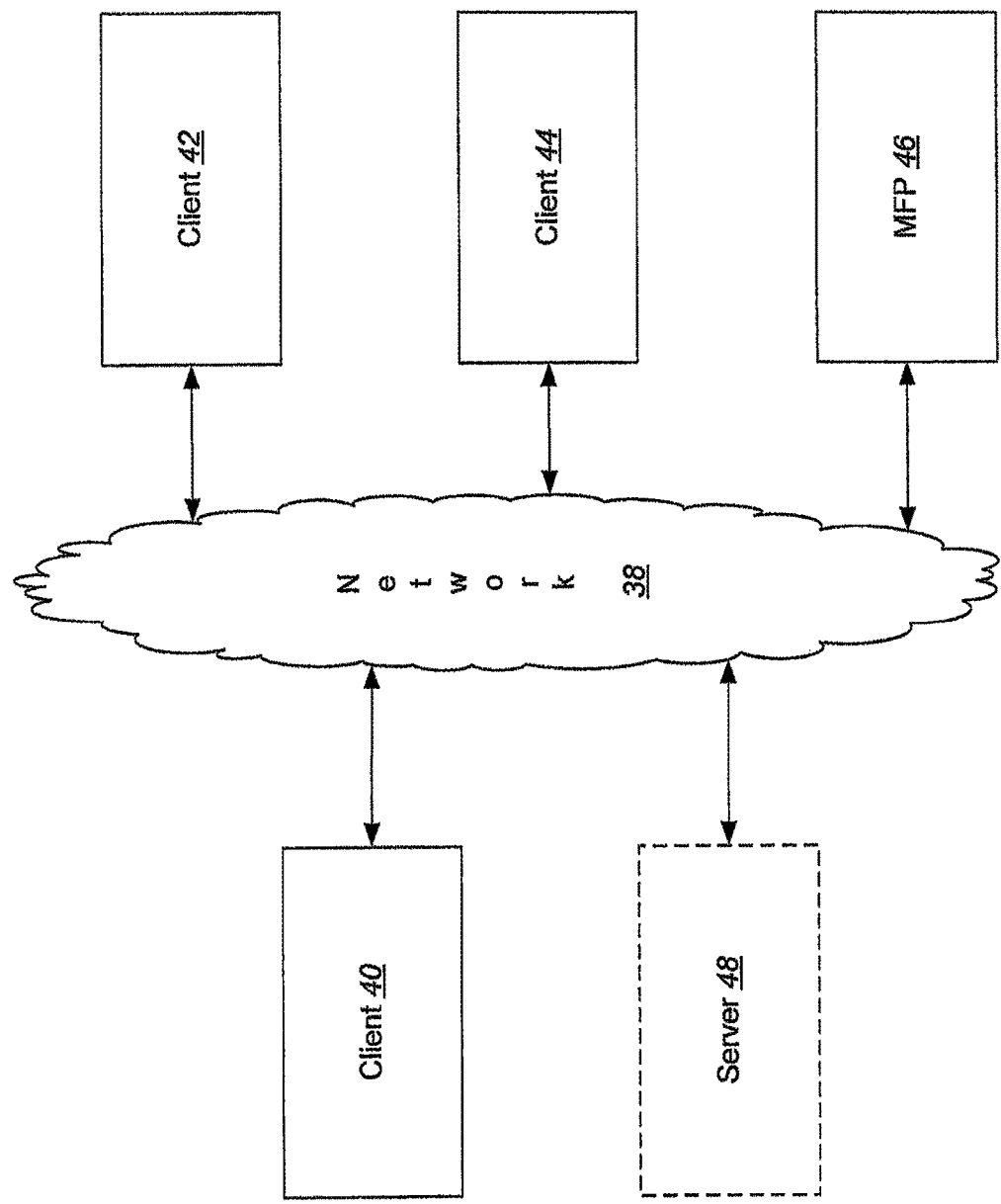
FIG. 2 shows a representative networked system configuration related to embodiments of the present invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

To minimize the need to download and/or install programs on users' computing devices, embodiments of the invention utilize existing web browser technology. Many browser programs currently exist or are under development, and it would be impossible to name all such browser programs, but examples of such programs include Microsoft's Internet Explorer, Mozilla Firefox, Google Chrome, Apple Safari, Opera Software's Opera browser, as well as myriad browsers specifically configured for specific devices, such as Internet-connected smart phones and the like. The exact display of each browser can vary from browser to browser and most are moderately to highly configurable so as to vary the exact display, Many currently-available browser programs permit the installation of additional features, such as through what are commonly known as "browser extensions." Browser extensions are becoming more and more common in today's browser programs, and have become one of if not the standard for extending the functionality of the browser programs. For browsers that do not currently support browser extensions, other mechanisms and installed programs are often available to provide similar functionality.

Embodiments of the invention may utilize a browser extension or similar format to provide functions in accordance with embodiments of the invention. The use and installation of a browser extension is typically significantly less involved and less computer-intensive than the use and installation of a stand-alone program. In many instances, the installation of the browser extension occurs essentially without the computer's operating system being made aware of any additional installation. Instead, the browser program itself handles the browser extension and any demands made by the browser extension.

Embodiments of the present invention may comprise sensors and/or emitters for measuring physical, psychological and physio-psychological characteristics of users and other parameters.

Some embodiments of the present invention may comprise a heart rate monitor. A heart rate monitor may comprise sensors for measuring heart activity. In some embodiments, the electrical activity of the heart is sensed by sensors in the heart rate monitor to measure heart beats. This heart beat data may be measured at the sensor and sent wirelessly to a receiver on another device. Heart rate monitors of embodiments of the present invention may be contained within a wearable device similarly to the accelerometer sensors described above.

Some embodiments of the present invention may comprise a photoplethysmographic (PPG) sensor, which measures blood volume changes in microvascular tissue. A PPG sensor or pulse oximeter may comprise light emitters, such as light emitting diodes (LEDs) that may emit light in multiple frequencies (typically, red and infrared) and measure the difference in the intensity of light received on the other side of the vascular tissue. During a cardiac cycle the blood pressure increases and decreases with the pumping of the heart, these pressure changes expand and contract the arteries causing volumetric changes in the vascular tissue and corresponding changes in tissue volume and absorbed light. The difference in light transmitted through the tissue during a cardiac cycle determines the heart beat profile or PPG profile. Some wearable devices of the present invention may comprise a PPG sensor otherwise known as a pulse oximeter or photoplethysmograph.

The PPG signal may also be used to measure or estimate other physiological parameters. In some embodiments, respiration rate, respiration volume, intrapleural pressure, sinus arrhythmia and other parameters can be calculated from PPG measurements. In some embodiments, the depth of anesthesia and hypo- or hyper-volemic conditions can be measured based on the PPG signal.

Some embodiments of the present invention may comprise a blood glucose sensor for determining the blood glucose level of a user. This sensor may comprise a light-based sensor, similar to the PPG sensor, but measuring blood sugar level, using a light emitter and sensor. Some embodiments may comprise sensors using ultrasound, electromagnetic and thermal sensors to determine blood sugar levels.

Some embodiments of the present invention may comprise sensors that measure a galvanic skin response (GSR) or electro dermal activity. GSR sensors may measure a galvanic skin resistance as an electrical resistance between two electrodes on the surface of the skin and may measure a galvanic skin potential as a voltage between two electrodes on the surface of the skin without any externally applied current. A GSR value may comprise a combination of a skin resistance value and a skin potential value.

Some embodiments of the present invention involve providing an identification system that utilizes radio frequency identification (RFID) within an entertainment facility. RFID provides an automatic identification method, relying on storing and remotely retrieving data using devices called RFID tags or transponders. An RFID tag can be attached to or incorporated into a product or person for the purpose of identification using radio waves. Chip-based RFID tags contain silicon chips and antennas. RFID tags come in three general varieties: passive, semi-passive (also known as semi-active), or active. Passive tags require no internal power source, whereas active tags require a power source.

Passive tags have practical read distances ranging from about 10 cm (4 in.) up to a few yards depending on the chosen radio frequency and antenna design/size. The response of a passive RFID tag is not necessarily just an ID number; the tag chip can contain non-volatile, electronically-erasable, programmable, read-only memory for storing data.

Active RFID devices produce communication signals by active transmission between the RFID tag and the reader system. They require a microprocessor and semiconductor, as well as battery power components, on each tag component. Some active tags have a practical reading range of over 100 feet.

In some embodiments of the present invention, the RFID tag can be carried on a person by a carrying means. These means include, but are not limited to an RFID tag coupled to a bracelet, necklace, broach, headband, ring, shirt, button, novelty pin, jacket, sweater, sweatshirt, pants, skirt, vest, gloves, a dress, glasses, a lanyard, a backpack, fanny-pack, purse, handbag, wallet, shoes, or other clothing, or the like. These means also include various types of headwear, such as a cap, hat, visor, headband, beanie, bonnet, beret, or the like. Hereafter, the term "headwear system" will refer not only to systems including headwear as the means for carrying a RFID on a person, as shown in FIG. 3, but also to systems wherein this means includes any of the non-headwear means described above.

Figure 3:
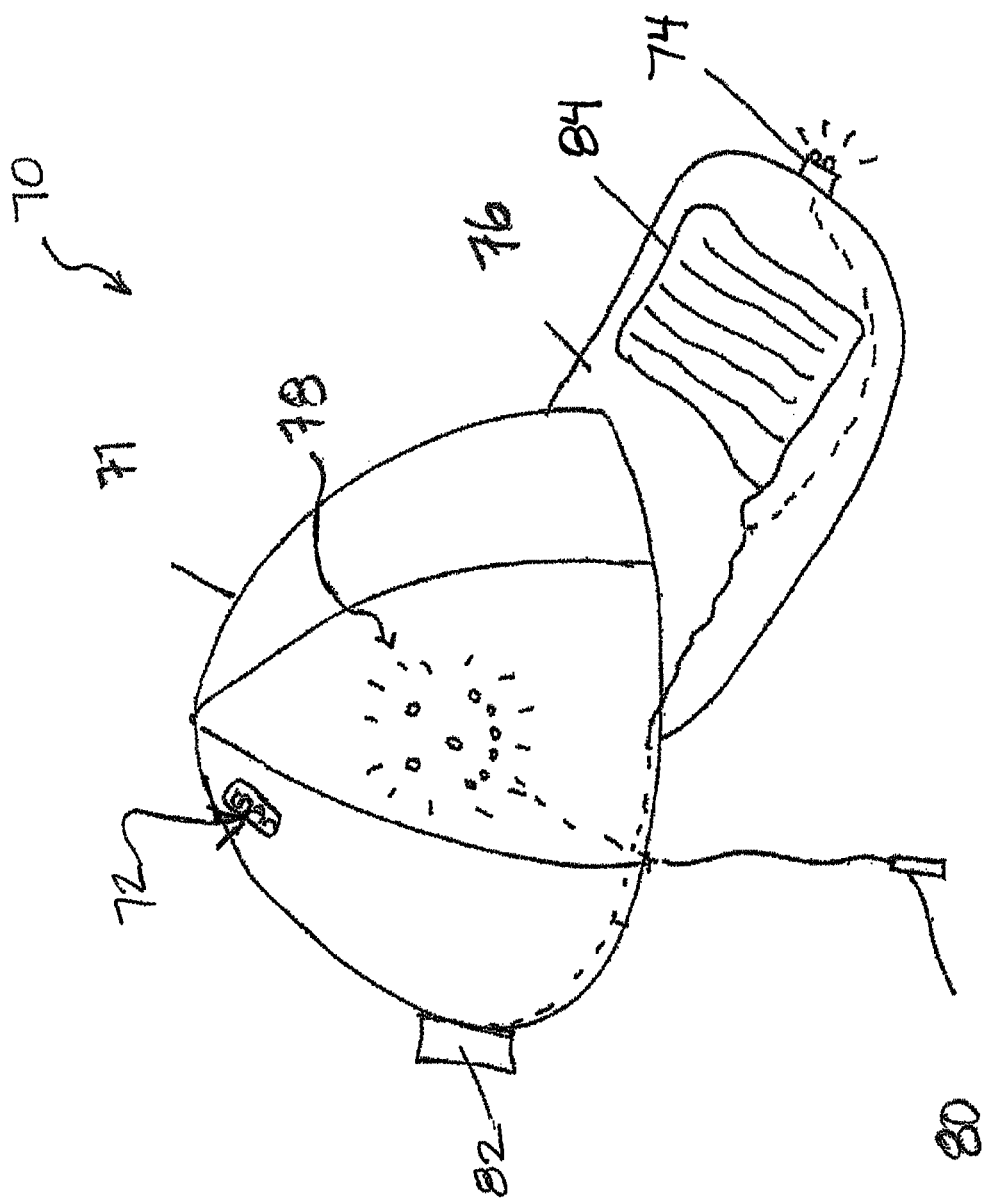
FIG. 3 shows an embodiment of the present invention comprising an array of light elements and other features.

FIG. 3 illustrates a headwear system 70 that includes headwear 71 and a RFID tag 72. The headwear system can utilize either an active, passive, or semi-passive type RFID tag. The RFID tag 72 of the present invention is carried by the headwear system either by being: sewn on, inserted into a pocket or sleeve, pinned on, buttoned on, adhered on, snapped on, attached with hook and loop material, woven into the fabric, or included with or coupled to the headwear system any other similar carrying means. The headwear system may conceal a RFID tag in the headwear such that the RFID tag is not visible when the headwear is worn.

Entertainment facilities may utilize the headwear system 70 having an RFID tag 72 and/or incorporate them into various amusement and crowd control features. Examples of an entertainment facility include, but are not limited to a: theme park, amusement park, movie theater, adventure park, carnival, circus, cruise ship, safari park, water park, amusement center, family fun center, funfair, ski resorts, outdoor parks, museums, libraries, craft fairs, gun shows, exhibition halls, sports stadiums, Olympic venues, National parks, State parks and other facilities like resorts, parks, and facilities. These entertainment or exhibition facilities may sell, rent, distribute, or otherwise provide headwear systems to visitors and persons entering their facilities. According to some embodiments, the headwear system includes an RFID tag that may include identification data and VIP status data, which identifies that RFID tag as a VIP tag or non-VIP tag. VIP tags may be acquired, for example, by paying a fee or because a visitor is an important visitor. Alternatively and additionally, VIP status may be won, earned, or awarded.

RFID reader systems within the entertainment facility read RFID tags included in visitor's headwear systems when a visitor enters within range of the reader. The range of a reader may be defined by an RF zone or RFID zone, which may be a 2-dimensional or 3-dimensional space. Typically, RFID readers systems include an RFID reader connected to an RFID antenna that sends and receives radio wave signals. The reader system may also include a computer system in communication with a RFID reader and which processes, stores, sends, and receives data. A plurality of RFID readers may connect to a single computer system. Alternatively and additionally, the RFID reader system may include a reader, antenna, and/or processor unit in a single apparatus, as will be understood by those of skill in the art. Thus, as used herein, the term "RFID reader" refers to an RFID reader system that may include an RFID reader, antenna, and computer system in a single or plurality of encasements.

Entertainment facilities may provide for various entertaining, novel, and informative effects and utilize various RFID tag/reader embodiment systems to produce these effects. A first embodiment relates to a system for compiling statistical information about visitor traffic within an entertainment facility. A second embodiment relates to a system for providing parents with location information of a lost child within an entertainment facility. A third embodiment relates to a system for producing an enhanced ride feature to a person on an amusement ride. A fourth embodiment relates to a system for producing an enhanced visual and/or audio effect in the entertainment facility for VIP visitors. A fifth embodiment relates to a system for announcing VIP entertainment. A sixth embodiment relates to a system for producing a visual effect from a light element coupled to the headwear system. Lastly, a seventh embodiment relates to a system for producing an audio effect from an audio device coupled to the headwear system.

A first embodiment relates to a system for gathering statistical information about visitor traffic within an entertainment facility. An entertainment facility may provide a plurality of RFID readers in strategic locations within their facility to gather information on visitor traffic and one or more visitor(s) having a headwear system 10. Each of the RFID tags has distinct identification information that may be assigned to a single visitor and recorded on a computer system. As visitors travel around the entertainment facility the RFID readers will register their presence when they enter into the readable range (RFID zone or proximity zone) of one of the RFID readers. These RFID readers may include one or more computer systems, as described above. The information collected by the RFID readers can provide entertainment facility personnel with information regarding the number of persons read within a proximity zone at a particular time, the identification information of persons within a proximity zone at particular time or period, who are presently within its proximity zone, the proximity zones in which a particular visitor entered, and other such information that will be apparent by those of skill in the art.

Computer system(s) included in the RFID readers process the information collected and compile statistical data regarding visitor traffic within the entertainment facility. Using this statistical data, administrators of the entertainment facility can learn what are the most popular locations and the highest traffic location, how many visitors each attraction receives at different times, what are the most and least popular attractions, age and gender of attraction visitors, and other such information that will be apparent by those of skill in the art. With this information, administrators can more effectively provide top quality visitor service and crowd control within the entertainment facility. Statistical information can assist to position attractions and services (i.e. restroom facilities, first-aid facilities, kiosks, booths, information centers, etc.) in their most effective and profitable locations, gauge and control line wait times, and plan for further development within the facility. Other uses of the statistical data will be apparent to those of skill in the art.

In a more particular embodiment, statistical data can be utilized to provide up-to-the-minute information to visitors regarding the estimated wait time for specific rides, tips for avoiding long lines, and other information useful to a visitor (i.e. times of day when attractions have the shortest waits, most and least popular attractions and/or shops, etc.). Alternatively and additionally, this information may only be available to VIP visitors.

A second embodiment relates to a system for providing a parent with location information of a lost child within an entertainment facility. As described above an entertainment facility may provide headwear systems 70 to visitors and a plurality of RFID readers positioned in strategic locations around the facility. In the instance that a child possessing a headwear system is lost or wanders from its parents, the child can be located by utilizing the RFID readers and computer system to locate the lost child. For example, by identifying the RFID reader that detects the child's RFID tag, a parent or entertainment facility personnel can know the location of the missing child. Some embodiments may comprise a receiver for receiving Amber alerts, tenor threat alerts, lost child alerts, hazardous weather alerts and other dangerous condition alerts, which may be communicated to a user by textual or graphical indicia on a display 130 or by audible message using headphones or earbuds 80, 114

A third embodiment relates to a system that produces one or more enhanced amusement ride feature(s) for ride carts containing VIP visitors. Amusement rides may include roller coasters, amusement rides, thrill rides, and the like. One or more RFID readers may be positioned on a seat, cart, track, or other part of the amusement ride within these amusement rides. Enhanced ride features may include at least one of the following: an alternate ride track, an additional ride track, an automatic second turn on the amusement ride, adjusted ride speed, alternative or additional music, alternative or additional visual effects, alternative or additional audio effects, or other features that will be apparent to those of ordinary skill in the art.

According to some embodiments, enhanced ride features may be age-group specific and/or available only for VIP visitors. Accordingly, RFID tags could include age data. For example, enhanced ride features may select alternative ride tracks designed for children when the RFID readers detect child-aged visitors on the ride. Moreover, the enhanced ride feature may include enhanced ride music, enhanced sound effects, or enhanced visual effects that are suited for children. Alternatively and additionally, ride speed may be adjusted up or down for different age-groups. For example, for teen-aged visitors enhanced ride features may include: faster ride speeds, alternative music selection, alternative or additional ride tracks that provided a greater thrill than the normal ride features. In some embodiments, the enhanced ride features may factor in the ages and/or VIP statuses of various passengers in a group who share the same ride cart. In this instance, the ride may select enhanced features for each age group, and/or enhanced features that may appeal to all age groups.

A fourth embodiment relates to a system for producing an enhanced visual and/or audio effect in the entertainment facility in proximity to VIP visitors. Such enhanced audio/visual effects may include automated features that move, project sound, change color, turn on one or more lights, and/or the like. For example, some automated features may take the form of a mechanically automated animal, ghost, or figure that jumps out from behind a bush when a VIP visitor is detected in proximity to this feature. In another example, figures or statues could ask for a handshake and extend a hand towards a VIP visitor. Other examples include, but are not limited to, automated figurines that move, talking figurines, fireworks, cameras that take picture of passing VIP members, and/or a variety of other automated or mechanical or electrical features that will be apparent to those of skill in the art.

A fifth embodiment relates to an advertising/announcing system within an entertainment facility that announces VIP entertainment features to VIP visitors. VIP visitor status may include added benefits above those of general visitors, which may include discounts, free admissions to particular attractions, shorter line waits, free services (i.e. food, tour, transportation, and/or other services), and the like. RFID readers in proximity to these VIP entertainment features may be configured to trigger one or more announcements or advertisements from an announcing/advertising system. When a VIP visitor enters the proximity of one such RFID readers the RFID readers will read the VIP status data and trigger a VIP announcement. Non-limiting examples of advertising/announcing systems include: display screens/panels, computer systems with display monitors, speaker systems, and/or the like. For example, a bus tour may be free to VIP visitors. When a VIP visitor enters the proximity of RFID readers near the tour bus station, their RFID tag will be read and a speaker may announce that the bus tour is free to VIP members. Additional advertising information may be announced by these announcing systems that is useful to both VIP and non-VIP visitors. Alternatively and additionally, the announcing/advertising systems may be primarily used for announcing and advertising facility information useful to general visitors of the entertainment facility, and VIP information may be integrated into the general announcements and/or advertisements.

Throughout an entertainment facility it may be desirable to trigger a headwear system to produce a visual or audio effect that coordinates with different locations, rides, performances, or events. For example, a visitor's headwear system can receive a signal from a transmitter or RFID antenna to trigger a lighting or visual effect on the headwear. These lighting and visual effects may coordinate with events, attractions, and/or music at different locations and times throughout the park. For example, a parade float may include a transmitter that signals a headwear system to trigger a visual and/or audio effect on the headwear that coordinates with the color, rhythm, and/or mood of the float. These transmitters may be positioned around the entertainment facility, such as in rides, theatres, restaurants, buses, kiosks, building, restrooms, and the like. These transmitters may take the form of an RFID reader with an antenna configured to transmit radio frequency signals to RFID tags within its transmission range. Accordingly, the sixth and seventh embodiments of the present invention relate to lighting and audio devices that can be coupled to a headwear system and respond to external signals.

A sixth embodiment relates to a system for producing a lighting effect from a lighting device coupled to the headwear system. One or more light elements can be configured on a headwear system for illuminating in response to a signal from a transmitter, as described above. As shown in FIG. 3, the headwear system 70 includes a light element 74. This light element connects to the perimeter or visor of the headwear 16. As shown in FIG. 3, the RFID chip may couple to an array of light elements 78, such as an array of optical fibers or LEDs. Alternatively, the light element may removably or fixedly couple to the headwear in a variety of configuration. For example, the light element could be an array of LED lights in the shape of a cartoon character. In addition, these lighting elements include but are not limited to headlamps, backstrap lamps, light tube decorative patches, LEDs, optical fibers, etc.

Various electrical power sources may be used to provide power to headwear system elements, including: batteries, electrical generation devices, etc. An electrical distribution system may be used to transfer electricity to various electrical accessories. The electrical distribution system includes various outlets that are covered when not in use to protect from corrosion. The outlets may be any type of releasable electrical coupling.

Also, as shown in FIG. 3, a seventh embodiment relates to a system for producing an audio effect from an audio device 80 coupled to a headwear system 70. One or more audio devices can be configured on a headwear system for producing sound in response to a signal from a transmitter, as described above. While FIG. 3 represents an audio device such as a speaker element, it will be understood that various types of audio devices may be coupled to an article of headwear including headphones, earbuds, speakers, and the like. For example, amusement rides may include transmitters that signal audio devices on headwear systems to produce sound that coordinates with the amusement ride and provides an enhanced, entertaining experience for visitors. As described above, various electrical power sources may be used to provide power to the speakers.

Some embodiments of the present invention may comprise a battery pack 82. Some embodiments may also comprise a photovoltaic (e.g., solar) panel 84 that may be connected to the battery 82, lights 74, 78 and other devices. Photovoltaic panel 84 may be used to recharge battery 82 when power demands allow.

In some embodiments of the present invention, announcements may be broadcast to attendees at an event. These announcements may be customized for each recipient based on data related to the recipients RFID tag information. In some embodiments, these announcements may comprise special promotions in various parts of the facility that promote a sale or discount or special event which moves people to a different location as desired by facility management. These announcements may be used for crowd control or other purposes.

Button

Figure 4:
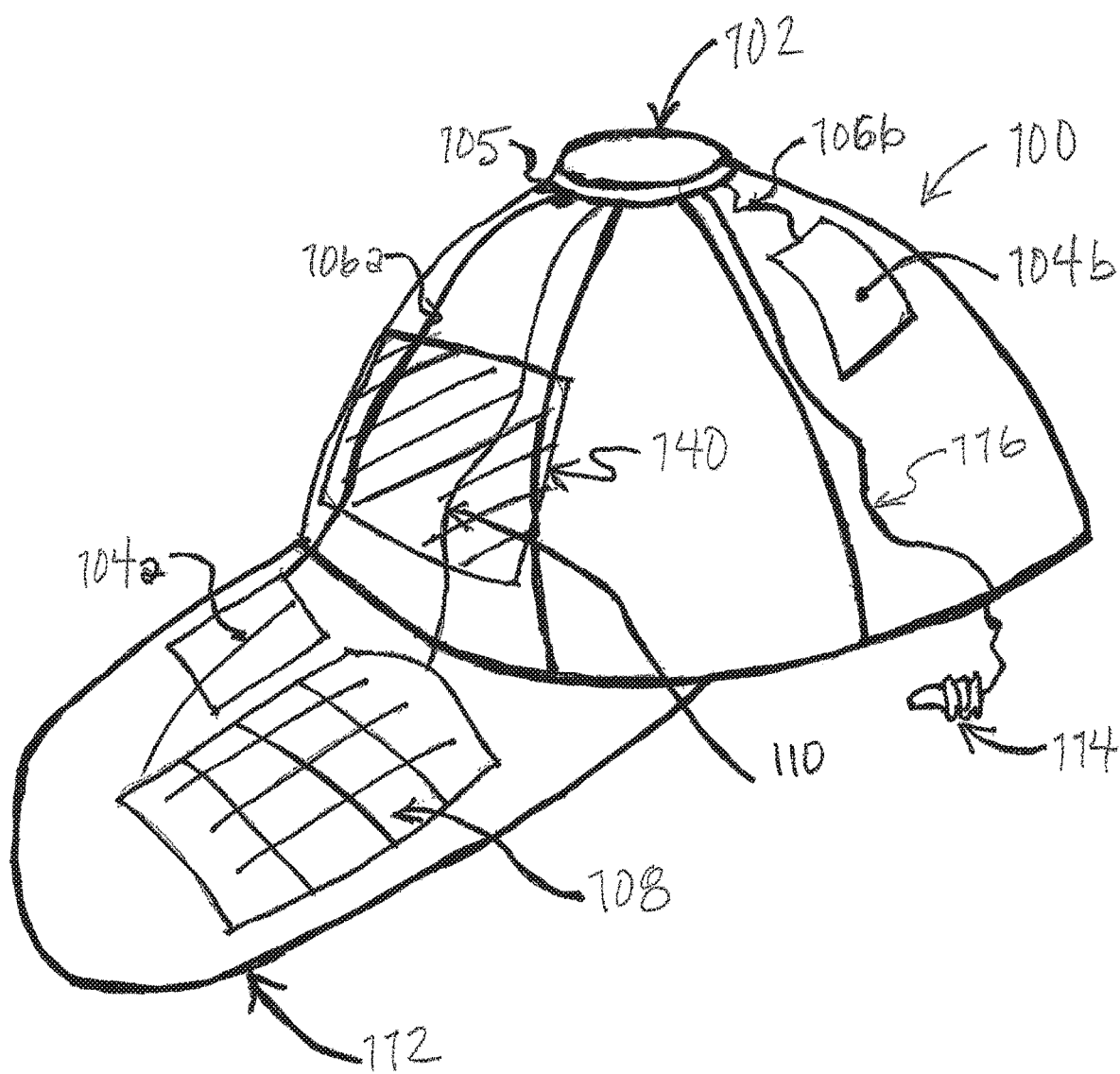
FIG. 4 shows an embodiment of the present invention comprising a detachable button and other features.

Some embodiments of the present invention, illustrated in FIG. 4, comprise a cap, hat or other headwear 100 further comprising a detachable button 102. The button 102 of these embodiments may comprise various electronic circuitry and may comprise its own battery or power source. However, in some embodiments, the button 102 may comprise a power plug 105 connection to connect to an external battery 104 on headwear 100. Headwear 100 may comprise a battery, ultra-capacitor or another power source 104 and may comprise wiring 106 to connect the headwear power source to the button 102. A headwear power source 104 may be located on the visor 112 as shown with power source 104a or may be located on the upper cap portion as shown with power source 104b.

In some embodiments, headwear 100 may comprise a power generation source 108 such as a photovoltaic panel with associated wiring and connectors 110 for the button 102.

Buttons 102 may comprise a variety of different electronic devices including, but not limited to, an antenna, an RF receiver, an RF transmitter, an RF transceiver, a speaker, a microphone, a light emitter, a camera, a wireless network interface, a Bluetooth interface, a global positioning system (GPS), a geolocator, a microprocessor, memory, a battery, combinations of these devices and other devices.

Buttons 102 may be swapped out as needed for the occasion. Buttons 102 may be automatically activated upon connection with headwear 100 or may comprise manual or automated on/off switching.

In some embodiments, a button 102 may comprise a locator. A locator may comprise a high-frequency radio transmitter capable of sending a broadband radio tracking signal aloft. A locator button may comprise a battery (e.g., a lithium ion battery) with a typical charge life of 72 hours or more during use. Replacing the button 102 with a charged backup locator button will extend the usable life another 72 hours or more. A search team may utilize a compatible tracking receiver to track and find the wearer of the locator button 102. A lost hiker, boy scout, child, elderly individual or other persons may be found using these embodiments.

Some embodiments of button 102 may comprise an antenna. In some embodiments, the button may comprise an antenna strong enough to pull in signal strength 10 times the normal range. In some embodiments, headwear 100 may comprise an on-board computer. An antenna button, used in conjunction with an on-board computer, may be used to receive a signal for a computer wireless device. In some embodiments, the on-board computer may comprise GPS. In these embodiments, the button may use the computer GPS to boost the capacity of a cell tower signal for the headwear and increase coverage performance.

Some embodiments of button 102 may comprise an audio speaker. When connected to other devices, this speaker may enable audio functions such as music, voice and other audio playback. Some embodiments may comprise amplified speakers.

Some embodiments of button 102 may comprise a microphone. These embodiments may be used to record audible input such as conversations, music, etc.

Some embodiments of button 102 may comprise a light emitter such as a light emitting diode (LED) light emitter, strobe light or another emitter. Some embodiments may emit infrared light for night-vision identification. Some embodiments may emit colored light, flashing light and light patterns.

Some embodiments of button 102 may comprise a camera for still image and/or video capture.

Some embodiments of button 102 may comprise a radio-frequency identification (RFID) tag. An RFID tag may be passive or may comprise an active RF emitter, which may be powered by an internal battery or a power source 104 on headwear 100.

The headwear 100 of some embodiments of the present invention may comprise detachable earbuds 114. These earbuds 114 may be wireless or may connect to headwear circuitry with wiring 116. In some embodiments earbuds 114 may connect to button 102 with wiring 116 or by wireless means. Earbuds 114 may be high fidelity with dynamic acoustic sound performance and may comprise noise isolation. Some embodiments may comprise multiple armature drivers. Earbuds 114 may connect to an on-board computer and be used for listening to music, video and typical audio playback functions.

In some embodiments, button 102 may comprise a RF receiver tuned to an event frequency and earbuds 114 may be used to listen to the audio broadcast on that frequency. For example, at a NASCAR race event, button 102 may be tuned to the track action frequency allowing a user to hear, via earbuds 114, race action broadcasts, which may include ground crew, driver and manager audio. Similarly, supplemental broadcasts at football, basketball, baseball and other sporting events can be accessed with the proper combination of button 102 and earbuds 114. Some embodiments may also comprise cell phone compatibility and may provide for cell phone use. Some embodiments may comprise noise cancellation features to eliminate ambient noise from traffic, engines, etc.

Figure 5:
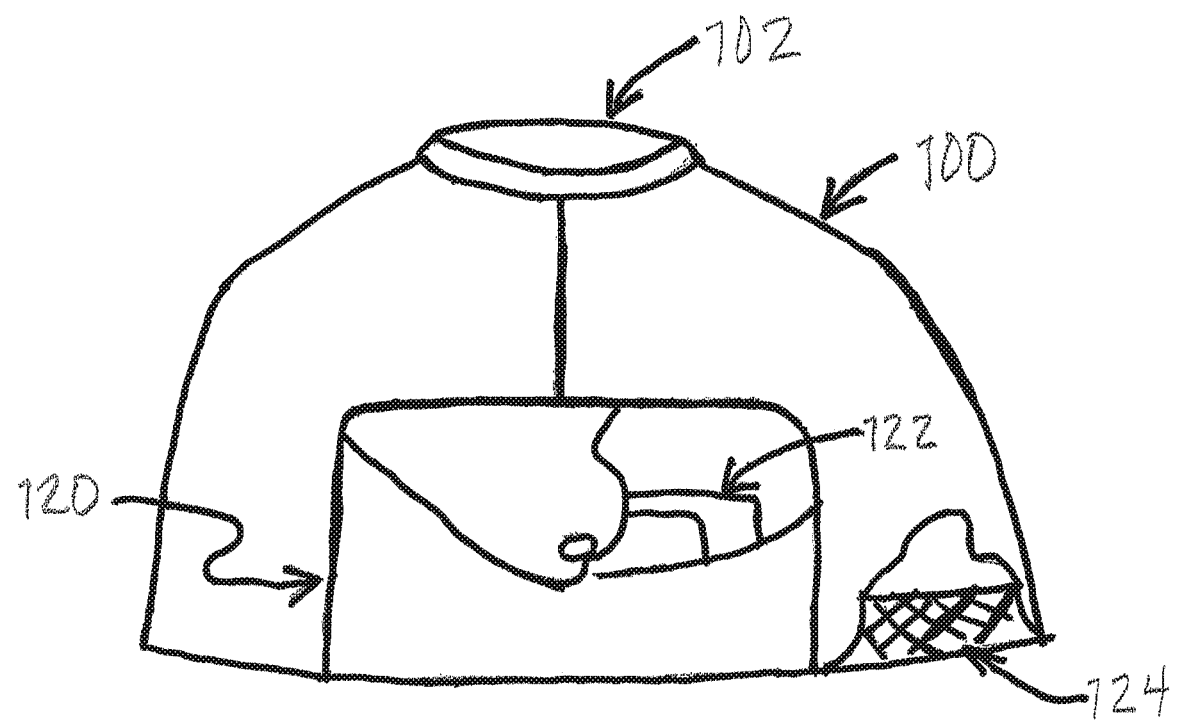
FIG. 5 shows an embodiment of the present invention comprising a microprocessor pouch and other features.

Some embodiments of the present invention, illustrated in FIG. 5, may comprise a back strap pouch or pocket 120. This pouch may be used to hold a microprocessor unit 122. In some embodiments, a microprocessor unit 122 may comprise a mobile computing device such as an iPhone, android phone or a customized circuit board such a Raspberry Pi or other configurations. The microprocessor unit 122 may draw power from the onboard power source 104 with a wired connection and may have its own battery as well. The microprocessor unit 122 may comprise a processor, memory, wireless network interface, Bluetooth interface, battery, display and/or other components.

The microprocessor unit 122 may comprise software or apps that operate in conjunction with button 102 functions and with other headwear 100 functions. In some embodiments, microprocessor unit 122 may comprise a sport/fitness app for tracking athletic activity (e.g., running progress, heartrate, etc.). In some embodiments, microprocessor unit 122 may interface with biometric or physiological characteristic sensors to track physical activity and health parameters.

Some embodiments of headwear 100, as illustrated in FIG. 5, may comprise a sweatband 124. A sweatband 124 of these embodiments may comprise soft, hypoallergenic, sweat-wicking loop material. In some embodiments, sweatband 124 may be a foundation for a system that features interchangeability. In these embodiments, sweatband 124 may be hardwired with micro-wiring that acts as a connecting system for various other components. Near the temple of the wearer, along the sweatband 124, a sensor may be located for taking an accurate measurement of the wearer's pulse. Other sensors may also be located along the sweatband 124 and may be affixed thereto by hook-and-loop-like attachment.

Figure 6:
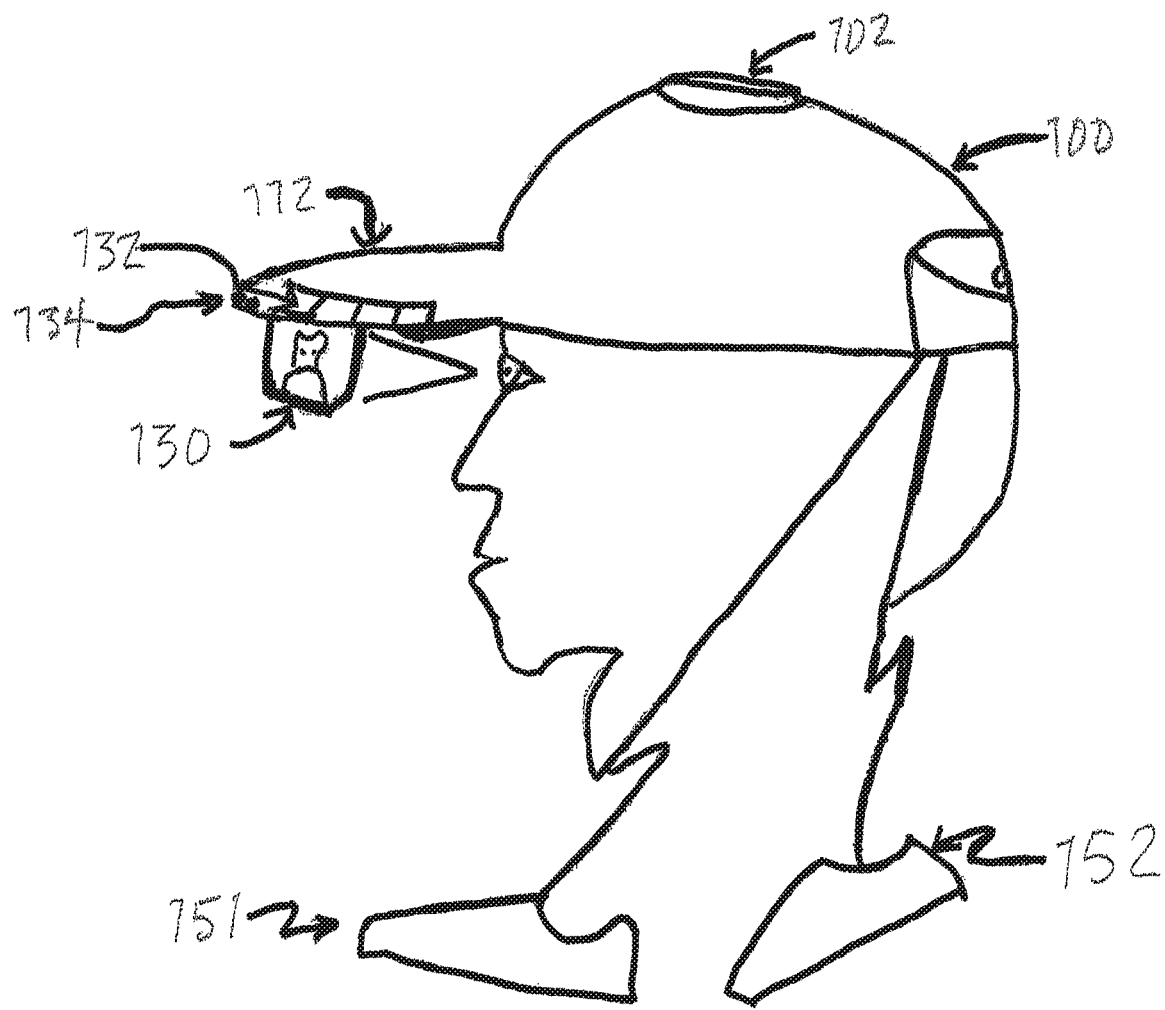
FIG. 6 shows an embodiment of the present invention comprising a visor with a display device and other features.

In some embodiments of the present invention, illustrated in FIG. 6, the top or the bottom of the visor 112 may comprise a display screen 130. The display screen 130 may be connected to the microprocessor unit 122 and may serve as a display for the microprocessor unit 122. The display screen 130 may function as a heads-up display (HUD) for navigation, gaming and other apps. In some embodiments, display screen 130 may comprise touch-screen technology for user input. In some embodiments, visor 112 may comprise input keys 132 for user input. In some embodiments, the visor 112 and screen 130 may be detachable from headwear 100. In some embodiments, visor 112 and/or screen 130 may comprise an independent power source such as a battery 104*a*.

In some embodiments, display screen 130 may comprise a highly transparent or translucent display that may flip down from the bottom of the visor 112. Some displays 130 may be tinted for use in the bright sunshine or ambient light. In some embodiments, the display 130 may be lowered from the visor by tapping the visor 112 in the manner used by pro ball players when a pop-fly occurs. Some displays 130 may comprise a projection unit to project an image onto the screen 130. Some displays 130 may comprise heads-up display technology to project an image onto a transparent screen.

In some embodiments, visor 112 may comprise LED lights 134 built into the leading edge of the visor 112 to act as a headlamp. In some embodiments, a microphone may be built into the lower side of the visor 112. This microphone may provide for voice command acceptance for microprocessor unit 122 apps.

In some embodiments, headwear 100 and visor 112 may comprise high-tech recycled plastic and carbon fiber. The visor 112 may be flat or curved and may be flexible or rigid.

In some embodiments, visor 112 may comprise laminated integrated circuitry. A visor can be plugged into the system as a stylish combination of art design and light show illumination. By using embedded micro filaments or fiber optic material infused into the plastic in various design patterns and colors, the visor 112 may become a light show unto itself.

Some embodiments of the present invention may comprise a detachable patch 140. Patches 140 of various sizes, colors, designs and shapes may be interchangeably exchanged as the occasion allows. Some patches 140 may be attached with a microplug and hidden wiring. Some other patches 140 may be affixed to the headwear 100 with a novel hook-and-loop electric circuit design. Basically, the hook and loop become the electric circuit once they are married together. The flat plane of the whole surface of the hook material is embedded with a metal hair-like grid and, similarly, the flat plane of the loop as middle fibers over that surface. A positive and negative charge connect to each part and, when the hook and loop surface of the two parts are joined, they form a completed electrical circuit, which provides power to the patch 140.

Some embodiments of the patch 140 comprise LED lights and micro fiber optic technology to make the patch 140 into a lit sign with a message, picture, pattern or other expression. This makes a formerly ordinary patch come to life and has a wide assortment of potential design possibilities. Therefore, the patch 140 becomes part of an intelligent grid system that is hardwired into headwear 100 or wirelessly connected thereto.

Some embodiments of the present invention comprise one or more batteries 104a, b, which may comprise lithium ion batteries. Some embodiments may also comprise an activated carbon nanotube-based ultra-capacitor power source. Onboard the headwear 100, may be an assortment of detachable high-tech computer, communication and media devices. A solar photovoltaic cell device 108 on the visor 112 may be used to charge power sources 104, etc. on the headwear 100 and power other devices.

In some embodiments, the headwear 100 is hardwired to each extended operational part, or wirelessly connected, the battery capability simply powers each part. A lightweight, but larger battery pack can be housed in the pouch 120 as well or in a visor 112 pouch (not shown). Due to size and weight, the power source will be more than adequate to take care of any demand need, particularly with the solar power backup and recharge capability.

Some embodiments of the present invention comprise headwear 100 with a wireless communications interface (e.g., IEEE 802.11(e) or (g), Bluetooth, ANT, etc.) for communication with physiological sensors, accelerometers and other data acquisition devices. In some embodiments, headwear 100 may communicate with shoes 151, 152 that comprise sensors and a wireless communication interface for transmitting information to the microprocessor unit 122.

Shoes 151, 152 may comprise sensors for pace, cadence, weight distribution, impact, acceleration in three dimensions, distance, time, temperature, pulse, humidity and other characteristics. Data from these sensors may be streamed to microprocessor unit 122 in real time. Instructions on microprocessor unit 122 may process this data and analyze it in real time as an athlete performs. The athlete may be apprised of the information in real time as well through display 130. Data may also be transmitted directly to a base station or team headquarters from microprocessor unit 122 by wireless network or telephone network.

In some embodiments, microprocessor unit 122 may digest and manipulate raw data into a personalized runners strategy and training plan. Real-time data is much more valuable than post-performance data as issues can be corrected during the performance rather than after. For example, a visor 112 with a display screen 130 that can display all the information a runner needs to know in order to make corrections, at the moment, in his or her style, method or management as the performance takes place can be invaluable to competitive athletes. These embodiments may comprise programmed interactive training software.

In some embodiments, real-time data acquisition from shoe and/or body sensors can be combined with button camera data and GPS data to form a total performance picture and keep the athlete and team apprised of current performance conditions. Headwear 100 may also comprise sensors such as pulse, brain function, temperature, respiration, perspiration and hydration.

Some embodiments of the present invention comprise headwear 100 comprised of "light fabric," that is fabric which conducts light. Light fabric comprises fiber optic threads connected to one or more light emitters. In some embodiments, fiber optic threads may be connected to LED sources. These light sources may comprise light sources coupled to the microprocessor unit 122 such that they can be programmatically controlled by computer-readable instructions implemented by the microprocessor unit 122. In some embodiments, the microprocessor unit 122 may use its network interface to lend control of the light sources to other networked devices.

In some embodiments, multiple headwear units 100, may be controlled by a master computing device. For example, the attendees in a stadium may all wear network-enabled headwear controlled by the stadium management who programmatically control all headwear in the stadium according to various patterns, in sync with music, in sync with team play and other patterns. In this manner, each headwear unit 100 may be a virtual pixel in a giant display in the stadium. In some embodiments, headwear 100 may comprise direct light sources without the light fabric to perform a similar function. In some embodiments, only the buttons 102 on headwear 100 may comprise one or more programmable, networked light sources.

In some embodiments, different areas of headwear 100 may be separately addressable for illumination and each area may be illuminated in a variety of colors, brightness levels and modulation patterns. Each distinct area, color and pattern may be controlled by a remote device through a network connection or may be controlled by the on-board microprocessor unit 122.

Some embodiments of the present invention may carry a smart phone in the pouch 120 and may electronically interface with the smart phone thereby allowing phone programmers to develop apps that integrate the headwear 100 and button 102 functions with phone features.

Figure 7:
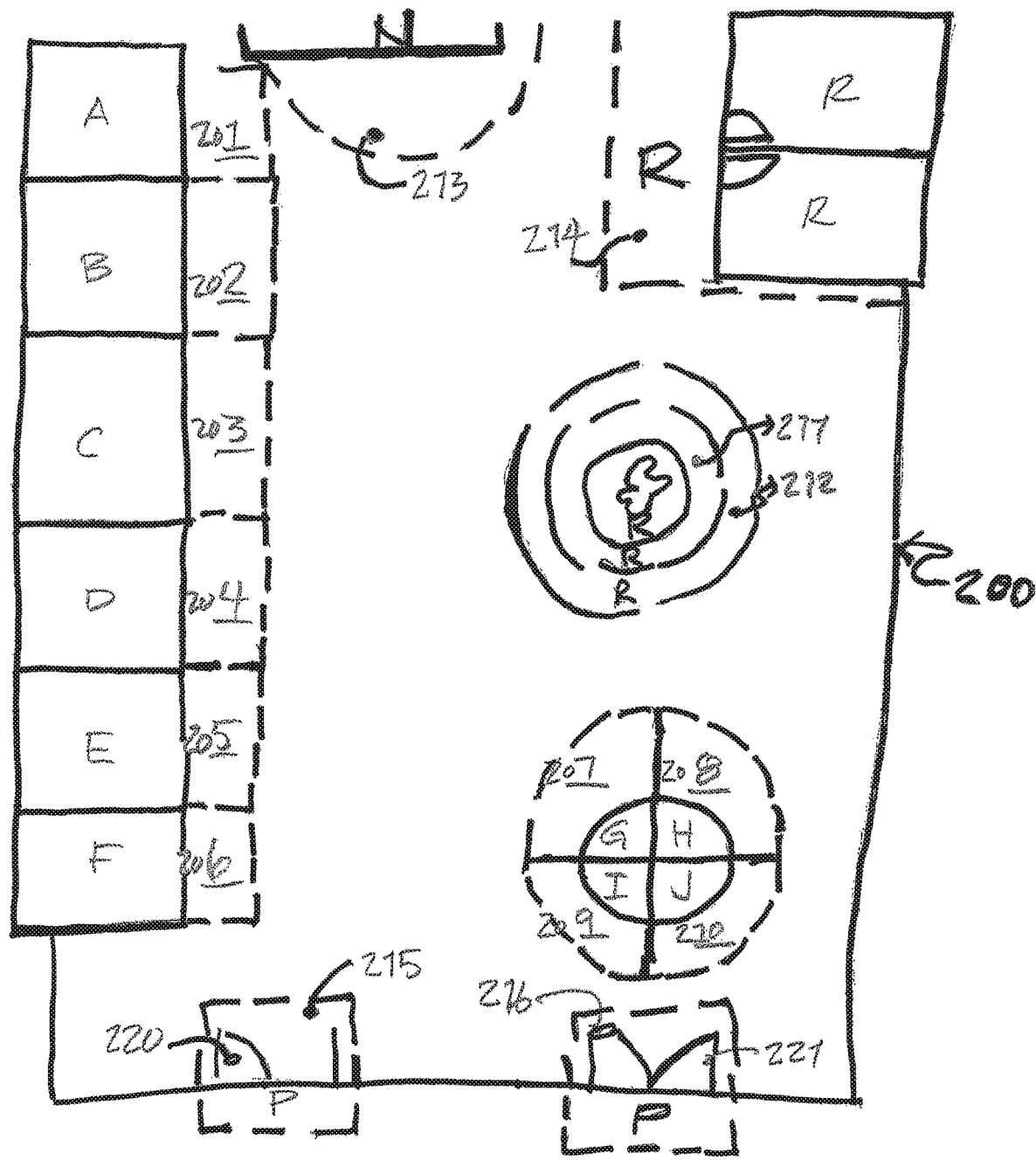
FIG. 7 shows an embodiment of the present invention comprising RFID zones and other features.

Some embodiments of the present invention relate to a selective permission system for an exhibition facility, as illustrated in FIG. 7. In these embodiments, an exhibition facility, such as an exhibition hall illustrated in floor plan 200 comprises exhibits A-K, food facility, N and restrooms, R, each in geometric proximity to an associated RFID zone or proximity zone 201-216. In these embodiments, a visitor wearing the appropriate RFID tag, such as on RFID tag-enabled headwear, will be detected by detectors or readers position in the zones and will benefit from events triggered by the presence of their RFID tag in each zone. In an exemplary embodiment, a visitor with an RFID tag who is outside exhibition hall 200 may trigger an event that opens or unlocks doors 220, 221 when the visitor walks into zones 215 or 216 thereby providing selective entry into exhibition hall 200. Additionally, a visitor with an appropriate RFID tag may visit booths A-F by entering zones 201-206 thereby triggering multimedia displays within those booths. A visitor with an appropriate RFID tag may also visit food facility N by entering zone 213 thereby triggering a multi-lingual display at food facility N which is customized to the visitor's language as identified on his RFID registration. Similarly, when entering zone 214, the appropriate language audio guide may be played for the visitor to identify the restroom facilities.

In some embodiments a display may be divided into quadrants G-J with associated zones 207-210. This type of display may be associate with a famous statue, exotic vehicle or other exhibit that has many facets. When a user wanders from one quadrant to another, a different description of the facets of that specific view are played to the user in audio, multimedia or another format. The description may be customized to be age appropriate, language-specific, technical background specific and other customization parameters.

In some embodiments, a display may comprise multiple annular zones 211-212 around an exhibit K such that the multimedia presentation presents more detail as a visitor gets closer to an exhibit. This configuration may be associated with a presentation scheme designed to draw a visitor toward an exhibit.

Some embodiments of the present invention may relate to travel and tourism sites such as city or site tours, museums, history tours, State tourism sites (e.g., capitol buildings and monuments) and promotional discounts. Similarly to the exemplary exhibition hall embodiment described above, these embodiments may comprise RFID zones scattered across a city or park with various monuments, statues, buildings each having its own RFID zone. When tourists venture into an RFID zone, a guided tour or information display or audio presentation may be presented to the tourists automatically and may be tailored to the tourist's personal characteristics (e.g., language, age, gender, etc.) as identified by the RFID data.

In some embodiments, an RFID tag may be associated with user characteristics that are stored in a memory, such as a database or other format. Upon registration, a user may identify name, age, gender, country of origin, education, cultural knowledge, native language, other languages, relationship to other tag holders and other parameters. This information may be stored in the database and accessed to customize exhibit functions and displays for that particular user. In this manner, when a visitor walks into an RFID zone, the system may identify the visitor, access the visitor's characteristics and customize the presentation for that particular user. Presentation language, technical detail, cultural detail, complexity and other parameters may be changed with respect to user characteristics. A computing device may receive the user ID from the RFID detector, select the appropriate presentation for that user and activate that presentation at the user location.

Likewise, when a family unit has been identified, the system may inform other family members of the location of other members who are not in their immediate vicinity.

In some embodiments, when a user's RFID tag enters a zone the following events may occur: announcing the location of a lost child, enabling an enhanced exhibit feature for a holder of said RFID tag, producing an enhanced visual effect in the exhibit facility in proximity to the RFID tag holder, audibly announcing an upgraded exhibit facility feature in proximity to the RFID tag holder, producing an enhanced audio effect in the exhibit facility in proximity to the RFID tag holder, producing an audio effect from an audio device connected to headwear containing the RFID tag, producing a visual effect from a visual effects device connected to headwear containing the RFID tag, opening a door, unlocking a door, activating a display, enabling access, supplying power to an exhibit, starting a motor, commencing an exhibition, prompting an exhibitor and providing a key or password.

Some embodiments of the present invention may provide for crowd control functions. When a threshold number of RFID tags in a specific zone are detected, specified events may occur to accommodate the elevated number of guests. These events may comprise opening an additional queue for the related exhibit, opening an additional ticket booth, offering an incentive for an alternative exhibit, providing directions to similar exhibits and other events.

Some embodiments of the present invention may enable headwear functions in response to detection of a user's RFID tag in a specific zone. For example, a user with RFID-enabled, multimedia headwear may walk into a zone related to an exotic car. The system will receive a proximity notice and access user characteristics. The system will then create a customized presentation description and send that description to the user's multimedia headwear. The multimedia headwear may then commence a presentation to the user that is customized to the user and the exotic car displayed at the user's location. These embodiments may be implemented on a large scale such as city-wide in popular tourist cities around the world.

Some embodiments of the present invention comprise a plurality of light emitting headwear units that are in relatively close proximity to each other. This situation may occur with stadium seating at a sporting event or another event where people are seated in a grid-like pattern in close proximity. In these embodiments, headwear comprising light emitters, power sources and network interfaces can be integrated into a display-like system wherein the illumination of each headwear unit is analogous to a pixel on a computer display.

Each unit's location may be established by seat number, ticket number, geolocation or by other methods. These locations may be correlated such that the system may address each unit according to its location on a grid pattern similarly to the addressing of pixels on a computer display. In this manner, patterns and images may be displayed on groups of headwear units that are organized in a grid-like pattern. Each unit may be turned on and off, modulated and color controlled as needed for a specific pattern or image. Scrolling text, wave patterns, team logos, game scores and other images, patterns and text may be illustrated.

In some embodiments, a headwear unit may comprise red, green and blue light emitters to provide a full color display unit.

In some embodiments, a stadium may comprise compatible light emitters on empty seats so that patterns may be completed even when the stadium is not full or when users do not have compatible, illuminated headwear.

Some embodiments of the present invention may comprise electronically-enhanced headgear 100 comprising a subscriber identification module (SIM) chip or card or a Removable User Identity Module (R-UIM) card as are commonly used in GSM and CDMA cell phones, respectively, to register a user. A user may utilize personalized menu options to select how they want their personal data to cross-reference with a chosen process or event.

In some embodiments, an event or exhibition venue may issue a SIM or R-UIM card which may be inserted into electronically-enhanced headgear. This event-specific chip may access the RFID tag to authorize cross-referencing of information and provide the user with event-specific information. In some embodiments, the SIM or R-UIM chip may provide access to wireless communication medium or network to download or otherwise receive event information. This information transmission may be coordinated with RFID zone triggers.

In some embodiments, a user may want to declare an age, choose a language preference for an experience or may want to cite health issues relevant to activities occurring at an event. This information may be accessed and transmitted to an event host when a user enters a general area or a specific RFID area where age-limited, language-specific or health-condition-sensitive activities occur. Likewise, a user's cultural preferences, food preferences or sensitivities, spending habits, religious sensitivities or other preferences or limitations may be recorded and made available to event host computing devices or staff.

In some embodiments, multiple SIM or R-UIM cards may be employed and connected with a microprocessor unit 122 on headgear 100. These connections may provide for cross-referencing available data between the cards via a software program as well as accessing an RFID tag so that a unique customized master-plan is ready for the visitor to use.

Some embodiments of the present invention provide for a personalized album commemorating an event or activity. In these embodiments, a camera, as part of button 102 or attached to another part of headwear 100, and a video recording device, which may be part of microprocessor unit 120 or another device attached to headwear 100. These embodiments may record continuous video and audio data during an entire event or activity. In some embodiments, key persons, places or things may be identified as important and the recording process may be paused until those identified persons, places or things are automatically detected in a video frame. In some embodiments, specific audio signatures, such as people's names, a dog's bark, key words or other audible indicia may be identified and the audio or video recording may be started, stopped, paused or otherwise modified when those audio signatures are detected. In this manner video and audio recording may be automatically controlled to record specific events only.

Similarly, in some embodiments, continuous recording may be performed and the recording may be subsequently edited using similar automated identification methods. In some embodiments, a program may be sued to record all the actions and events of a day and then create a special video tape as a keepsake that has all the professional appearance of an expensively produced media feature and will become a treasured take home DVD memento for the visitor and their family.

In some embodiments, headwear 100 may comprise a digital video camera, as a button 102 attachment or attached at another location. In some embodiments, this camera may be mounted to a patch location 140 or may be mounted to the visor 112. The camera may be programmed to record an event in its entirety. All the comings and going at the event, the rides, the VIP lunch, the special shows, the personal chit-chat, the joking around and all the interaction between the participants may all be recorded. A wireless remote may also allow a user to pick and choose the events most desired to record or may allow a user to turn the camera on and off as desired. At the end of the day or event, a special album program may allow a user to see an overview of the day's happenings and to assemble and quickly edit the recording into one unified video album. Some options may allow a user to exercise more creative control or less as a user edits a recording.

In some embodiments, a program may provide a professional artistic format that is prerecorded with media-quality stock video, pictures, announcer audio and music to introduce and provide a theme. The user's personal video content may be interspersed and edited throughout the production to give the appearance of a professional quality and scripted media presentation.

In some embodiments, a location near the exit of a theme park, exhibition hall or other area may provide assistance with completion of video editing and final DVD recording. Staff members may show visitors how to quickly make several choices to individualize and edit their content into a treasured keepsake.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A selective permission system for an entertainment facility, the system comprising:
   a wearable headwear containing an active RFID tag, said active RFID tag having a microprocessor, antenna, semiconductor and battery;
   an RFID reader within the active RFID detection zone detecting active RFID tags on guests and uniquely registering presence of active RFID tags of the guests each time the guests enter into the active RFID detection zone, the guests wearing headware containing the RFID tag is only registered when inside the active RFID detection zone; and
   a monitor to display information customized to the guests based on VIP and age-related status stored on the active RFID tag, said information including an estimated wait time for ride in entertainment facility based on the VIP or age-related status of the guest and whether the guest's status allows the guest to use a shorter line and additional information only available to a guest with a particular status wherein movement of the active RFID tag is tracked and compiled to provide statistical information about visitor traffic within the entertainment facility and the detecting active RFID tags on guests activates instructions on a microprocessor unit within the wearable RFID tag to send instructions to a multi-media device present in a multi-media display on multi-media devices in the vicinity of the active RFID tag as guests wearing the active RFID tag passes by.

2. The system of claim 1, wherein the entertainment facility comprises but not limited to theme park, amusement park, movie theater, adventure park, carnival, circus, cruise ship, safari park, water park, amusement center, family fun center, funfair, ski resorts, outdoor parks, museums, libraries, craft fairs, gun shows, exhibition halls, sports stadiums, Olympic venues, National parks, State parks and other facilities like resorts, parks, and facilities.

3. The system of claim 1, wherein the additional information comprises announcements of free food, transportation or directions to special entrances with shorter lines.

\* \* \* \* \*